United States Patent
Ren

(10) Patent No.: US 10,841,306 B2
(45) Date of Patent: Nov. 17, 2020

(54) SYSTEM FOR AUTHENTICATION CENTER

(71) Applicant: Shaohua Ren, Beijing (CN)

(72) Inventor: Shaohua Ren, Beijing (CN)

( * ) Notice: Subject to any disclaimer, the term of this patent is extended or adjusted under 35 U.S.C. 154(b) by 14 days.

(21) Appl. No.: 15/932,806

(22) Filed: Apr. 28, 2018

(65) Prior Publication Data

US 2018/0255059 A1 Sep. 6, 2018

Related U.S. Application Data

(63) Continuation of application No. PCT/CN2016/102938, filed on Oct. 21, 2016.

(30) Foreign Application Priority Data

| Nov. 3, 2015 | (CN) | 2015 1 0740190 |
| Nov. 23, 2015 | (CN) | 2015 1 0823053 |
| Dec. 5, 2015 | (CN) | 2015 1 0886431 |
| Feb. 8, 2016 | (CN) | 2016 1 0084169 |
| Feb. 25, 2016 | (CN) | 2016 1 0105838 |
| Mar. 4, 2016 | (CN) | 2016 1 0125833 |
| Aug. 3, 2016 | (CN) | 2016 1 0630558 |

(51) Int. Cl.
*H04L 29/06* (2006.01)
*H04L 29/08* (2006.01)

(52) U.S. Cl.
CPC .......... *H04L 63/0884* (2013.01); *H04L 29/08* (2013.01); *H04L 63/102* (2013.01)

(58) Field of Classification Search
CPC ... H04L 63/0884; H04L 29/08; H04L 63/102; H04L 63/0815; H04L 67/14
USPC ............................................................ 726/3
See application file for complete search history.

(56) References Cited

U.S. PATENT DOCUMENTS

| 9,984,686 B1* | 5/2018 | Mutagi | G10L 15/22 |
| 2014/0082151 A1* | 3/2014 | Chen | H04L 67/14 709/219 |

* cited by examiner

*Primary Examiner* — Mohammad W Reza

(57) ABSTRACT

This invention provides a system for authentication center, so that a user can manage centrally at the authentication center the login status or the session status of different terminals used by the user logging in the accounts which the user has at different service parties.

20 Claims, 1 Drawing Sheet

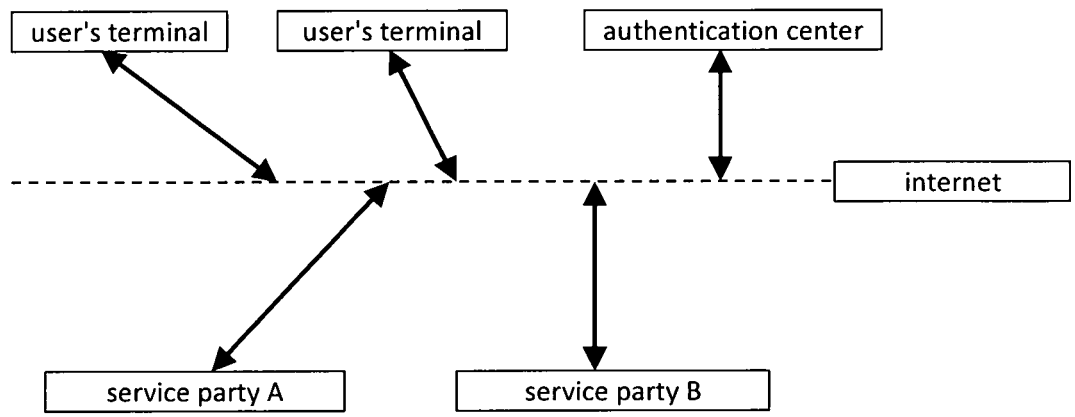

SYSTEM FOR AUTHENTICATION CENTER

TECHNICAL FIELD

This invention is about the systems or methods for authentication center.

BACKGROUND

Nowadays people generally use multiple terminals to access internet, and often use different terminals to log in their own accounts at various websites and providers providing service through internet. Many of these logins and sessions are persistent, and even when the user closes the browser used by the user or closes the terminal phone, the login status or the session status of the terminal phone is maintained, as are popular apps such as WeChat. This leads to the problem that after the terminal is replaced (for example, a new cell phone), the original terminal still maintains the login status or the session status of the terminal logging in the user account. When a user uses the multiple terminals, it is hard to remember and manage the validation of the login status or the session status of different terminals. This creates a huge security loophole and hidden danger, and now there is no network service to help users to centrally manage their own accounts' login status.

SUMMARY

In view of the above security problems, this invention provides a system for authentication center to enable a user to manage centrally in one authentication center the login status or the session status of different terminals used by the user loggin in the accounts which the user has at different service providers. The details of this invention are as bellow.

A system for authentication center, comprising an authentication center, service parties, users and terminals; where a service party is a provider of service on internet which provides service through internet, and the service parties are different and separate providers of service on internet; where the authentication center is a service provider which provides login information service through internet, and the authentication center is not one of the service parties, the service parties trust the authentication center; where the terminals are connected with the authentication center and the service parties by a network and are capable of communicating with them; where the terminals, the service parties and the authentication center are connected through internet; where a user has a user account at the authentication center, and the AUID of a user is a user account which the user has at the authentication center; where a user has a user account at one service party or at each of more than one service party separately, and an APID of a user is a user account which the user has at a service party; where a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; where the authentication center stores the corresponding relationships between the AUID of a user and the APIDs which the user has at different service parties; where a service party is capable of sending the login status or the session status of different terminals used by a user logging in the APID which the user has at the service party to the authentication center; where after a user logs in the AUID which the user has at the authentication center by using a current terminal, the authentication center is capable of sending the login status or the session status of different terminals used by the user logging in the APIDs which the user has at different service parties to the current terminal used by the user, where on the current terminal's interface which has logged in the AUID which the user has at the authentication center, the user is capable of seeing and changing or stopping or disabling the login status or the session status of different terminals used by the user logging in the APIDs which the user has at different service parties; where on a current terminal's interface which has logged in the AUID which a user has at the authentication center, the user is capable of changing or stopping or disabling the login status or the session status of a terminal used by the user logging in the APID which the user has at a service party, and the authentication center is capable of sending the user's instruction of changing or stopping or disabling to the service party, and the service party is capable of changing or stopping or disabling the login status or the session status of the terminal used by the user logging in the APID which the user has at the service party according to the user's instruction.

Optionally, when a user is logging in the APID which the user has at a service party by using a terminal, the service party sends the "terminal identification information" of the terminal to the authentication center, and then the authentication center returns a confirmation to the service party and the confirmation permits or forbids the login, or when a terminal of a user has logged in the authentication center first and then logs in the APID which the user has at a service party by using the authentication center, the authentication center decides directly if the login is permitted.

Optionally, each time a user uses a terminal to reconnect and log in a service party, the terminal sends the "terminal identification information" of the terminal or the "terminal service party identification information" of the terminal to the service party, where the login status or the session status sent by a service party to the authentication center includes the "terminal identification information" corresponding to a terminal, where the service party is capable of getting the "terminal identification information" of a terminal according to the "terminal service party identification information" of the terminal.

Optionally, a user logs in the AUID which the user has at the authentication center by using an authentication program on a terminal, and the user is capable of setting the login status or the session status on the interface of the authentication program which has logged in the AUID which the user has at the authentication center, and the program which the user uses to log in the APID which the user has at a service party is not the authentication program.

Optionally, when a user logs in the AUID which the user has at the authentication center by using a terminal, the authentication center is capable of sending the request for refreshing the login status or the session status to the service parties which the corresponding APIDs of the user are at, and then each of the service parties which receive the request for refreshing the login status or the session status sends the login status or the session status of different terminals used by the user logging in the APID which the user has at the service party to the authentication center, or when a user requests for refreshing the information of the login status or the session status on a terminal's interface which has logged in the AUID which the user has at the authentication center, each of the service parties which receive the request is capable of sending the login status or the session status to the authentication center.

Optionally, the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party.

Optionally, a user has a user account or an APID at each of at least two different service parties separately.

Optionally, a user is capable of using different terminals to log in a service party.

Optionally, on a terminal's interface which has logged in the authentication center, the user is capable of seeing the list of the login status or the session status of different terminals which the user used or is using logging in the APIDs which the user has at different service parties.

Optionally, the APIDs which a user has at different service parties are separate from each other.

Optionally, on a terminal's interface which has logged in the AUID which a user has at the authentication center, the user is capable of distinguishing different terminals according to the login status or the session status of different terminals used by a user logging in the APIDs which the user has at different service parties.

Optionally, on a terminal's interface which has logged in the AUID which a user has at the authentication center, the user is capable of distinguish different terminals according to the login status or the session status of different terminals used by a user logging in the APIDs which the user has at different service parties, and the user is capable of changing or stopping or disabling the login status or the session status of one terminal of different terminals used by the user logging in the APID which the user has at a service party, and the authentication center is capable of sending the user's instruction of changing or stopping or disabling to the service party, and the service party is capable of changing or stopping or disabling only the login status or the session status of the one terminal used by the user logging in the APID which the user has at the service party according to the user's instruction.

Optionally, on a current terminal's interface which has logged in the AUID which a user has at the authentication center, the user is capable of changing or stopping or disabling the login status or the session status of a terminal used by the user logging in the APID which the user has at a service party, and the authentication center is capable of sending the user's instruction of changing or stopping or disabling to the service party, and the service party is capable of changing or stopping or disabling the login status or the session status of the terminal used by the user logging in the APID which the user has at the service party according to the user's instruction, where the terminal is not the current terminal.

Optionally, a user is capable of making one or more types of settings, and the one or more types of settings include: a user is capable of setting at the authentication center to permit or forbid a specific terminal to log in the APID which the user has at a specific service party; a user is capable of setting at the authentication center to permit or forbid a specific terminal to use a specific function of the user account which the user has at a specific service party; a user is capable of setting at the authentication center to forbid the terminal which is not registered on the authentication center or which is not associated with the AUID which the user has at the authentication center to log in the APID which the user has at a specific service party or to log in the APIDs which the user has at all service parties; a user is capable of making a setting at the authentication center or the authentication center is capable of making a setting automatically by default, where the setting is that a specific terminal must log in the APID which the user has at a specific service party by using the authentication center or that a specific terminal is capable of logging in the APID which the user has at a specific service party only when the user has logged in the AUID which the user has at the authentication center by the authentication program.

Optionally, the service parties trust the authentication center, so after a user associates the user's AUID with the user's APID at a service party correspondingly, the service party is capable of sending the login status or the session status of a terminal used by the user logging in the APID which the user has at the service party to the authentication center and is capable of changing or stopping or disabling the login status or the session status of a terminal used by the user logging in the APID which the user has at the service party according to the user's instruction which is set by the user at a terminal's interface logged in the user's AUID at the authentication and which is sent to the service party by the authentication center.

A system for authentication center, comprising an authentication center, service parties, users and terminals; where a service party is a provider of service on internet which provides service through internet, and the service parties are different and separate providers of service on internet; where the authentication center is a service provider which provides login information service through internet, and the authentication center is not one of the service parties, the service parties trust the authentication center; where the terminals are connected with the authentication center and the service parties by a network and are capable of communicating with them; where the terminals, the service parties and the authentication center are connected through internet; where a user has a user account at the authentication center, and the AUID of a user is a user account which the user has at the authentication center; where a user has a user account at one service party or at each of more than one service party separately, and an APID of a user is a user account which the user has at a service party; where a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; where the authentication center stores the corresponding relationships between the AUID of a user and the APIDs which the user has at different service parties; where a service party is capable of sending the login status or the session status of different programs on different terminals used by a user or different programs used by a user logging in the APID which the user has at the service party to the authentication center; where after a user logs in the AUID which the user has at the authentication center by using a current terminal, the authentication center is capable of sending the login status or the session status of different programs on different terminals used by the user or different programs used by the user logging in the APIDs which the user has at different service parties to the current terminal used by the user, where on the current terminal's interface which has logged in the AUID which the user has at the authentication center, the user is capable of seeing and changing or stopping or disabling the login status or the session status of different programs on different terminals used by the user or different programs used by the user logging in the APIDs which the user has at different service parties; where on a current terminal's interface which has logged in the AUID which a user has at the authentication center, the user is capable of changing or stopping or disabling the login status or the session status of a program on a terminal used by the user logging in the APID which the user has at a service party, and the authentication center is capable of sending the user's instruction of changing or stopping or disabling to the service party, and the service party is capable of changing or stopping or disabling the login status or the session status of the program of the terminal used by the user logging in the APID which the user has at the service party according to the user's instruction.

Optionally, the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party; where a user has a user account or an APID at each of at least two different service parties separately; where a user is capable of using different terminals to log in a service party.

Optionally, the login status or the session status sent by a service party to the authentication center includes the "program identification information" corresponding to a specific program on a terminal, or the login status or the session status sent by a service party to the authentication center includes the "terminal identification information" corresponding to a terminal and the "terminal identification information" includes or is accompanied with the "program identification information" by which to distinguish different programs on the terminal, where a user or the authentication center is capable of identifying a specific program which the user uses on a terminal to log in the APID which the user has at a service party.

Optionally, the service parties trust the authentication center, so after a user associates the user's AUID with the user's APID at a service party correspondingly, the service party is capable of sending the login status or the session status of a program of a terminal by the user logging in the APID which the user has at the service party to the authentication center and is capable of changing or stopping or disabling the login status or the session status of a program of a terminal used by the user logging in the APID which the user has at the service party according to the user's instruction which is set by the user at a terminal's interface logged in the user's AUID at the authentication and which is sent to the service party by the authentication center.

A system for authentication center, comprising an authentication center, service parties, users and terminals; where a service party is a provider of service on internet which provides service through internet, and the service parties are different and separate providers of service on internet; where the authentication center is a service provider which provides login information service through internet, and the authentication center is not one of the service parties, the service parties trust the authentication center; where the terminals are connected with the authentication center and the service parties by a network and are capable of communicating with them; where the terminals, the service parties and the authentication center are connected through internet; where a user has a user account at the authentication center, and the AUID of a user is a user account which the user has at the authentication center; where a user has a user account at one service party or at each of more than one service party separately, and an APID of a user is a user account which the user has at a service party; where a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; where the authentication center stores the corresponding relationships between the AUID of a user and the APIDs which the user has at different service parties; where a user is capable of making one or more types of settings, and the one or more types of settings include: a user is capable of setting at the authentication center to permit or forbid a specific terminal to log in the APID which the user has at a specific service party; a user is capable of setting at the authentication center to permit or forbid a specific terminal to use a specific function of the user account which the user has at a specific service party; a user is capable of setting at the authentication center to forbid the terminal which is not registered on the authentication center or which is not associated with the AUID which the user has at the authentication center to log in the APID which the user has at a specific service party or to log in the APIDs which the user has at all service parties; a user is capable of making a setting at the authentication center or the authentication center is capable of making a setting automatically by default, where the setting is that a specific terminal must log in the APID which the user has at a specific service party by using the authentication center or that a specific terminal is capable of logging in the APID which the user has at a specific service party only when the user has logged in the AUID which the user has at the authentication center by the authentication program.

Optionally, the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party; where a user has a user account or an APID at each of at least two different service parties separately; where a user is capable of using different terminals to log in a service party.

Optionally, a user is capable of making one or more types of further settings, the one or more types of further settings include: a user is capable of setting at the authentication center to permit or forbid a specific program or a specific program on a specific terminal to log in the APID which the user has at a specific service party; a user is capable of setting at the authentication center to forbid a specific program on a specific terminal or a specific program which is not registered on the authentication center or not associated with the AUID which the user has at the authentication center to log in the APID which the user has at a specific service party or to log in the APIDs which the user has at all service parties; a user is capable of making a setting at the authentication center or the authentication center is capable of making a setting automatically by default, where the setting is that a specific program on a specific terminal or a specific program must log in the APID which the user has at a specific service party by using the authentication center or that a specific program on a specific terminal or a specific program is capable of logging in the APID which the user has at a specific service party only when the user has logged in the AUID which the user has at the authentication center by using the authentication program; a user is capable of setting at the authentication center to permit or forbid a specific program on a specific terminal or a specific program to use a specific function of a specific service party.

BRIEF DESCRIPTION OF THE DRAWINGS

FIG. 1 is a network structure diagram of Embodiment 1.

DETAILED DESCRIPTION

Embodiment 1

In this embodiment the authentication center is the server (server group) of a service provider which provides login information service through internet. This embodiment includes different service parties and these service parties are different and separate providers which provide service through internet and which trust the authentication center (for example: two separate websites—service party A and service party B). A user uses different terminals to log in the service parties and the different terminals include multiple terminals of different types which include mobile phone, PC, tablet computers, etc (for example: a user may have 2 PCs, 1 mobile phone, 1 tablet computer, which are 4 different terminals of 3 types totally).

Firstly, the following Preposed-step is required to be carried out and needs to be carried out only once.

Preposed-step: a user registers APID-A at the service party A and registers APID-B at the service party B and registers AUID at the authentication center, and then at the different service parties (A and B) or at the authentication center, the user associates APID-A and APID-B to AUID, and the different service parties (A and B) send the association notifications to the authentication center to confirm or the authentication center sends the association notifications to the different service parties to confirm.

For example: after the user logs in the service party A, the user sends the AUID which the user has at the authentication center to the service party A; and the service party A sends the user's APID-A and AUID together as the association notification to the authentication center; and if the authentication center confirms that the AUID exists, the authentication center stores the APID-A and the AUID correspondingly and returns association confirmation to the service party A; and after the service party A receives the association confirmation, the service party A stores the AUID and the user's APID-A correspondingly; and the service party A returns the message of association success to the authentication center. For another example: after the user logs in the authentication center by using a terminal, the user inputs the user's APID-B at the service party B, the name of the service party B, and the user's identification password at the service party B into the terminal's interface which has logged in the authentication center to associate; and the authentication center sends the association notification which includes the user's APID-B at the service party B, the user's identification password at the service party B and the AUID which the user has at the authentication center to the service party B; and if the service party B confirms that the identification password is correct, the service party B stores the user's APID-B and AUID correspondingly and returns the association confirmation to the authentication center; after the authentication center receives the association confirmation, the authentication center stores the user's APID-B and AUID correspondingly too; and at last the authentication center sends the message of association success to the service party.

Then the following steps are capable of being carried out.

The first step, the user logs in the APIDs which the user has at different parties separately by using different terminals or by using different programs on the terminals (for example, a PC and a mobile phone separately log in both the service party A and B and maintain the valid login status). And if the user has not made a terminal exit from the login logging in a service party, the user is capable of logging in the APID at the service party directly with no need for that the user passes the identity authentication on the terminal by inputting a user verification information or by using a user verification device or that the user passes the indirect authentication of a third party. And a valid status of a login is maintained by a valid session between a terminal (the PC, the mobile phone) and a service party (A, B), for example: after the user logs in the service party A by using a PC, the service party A generates a session secret key (such as Cookie) to send to the PC; and the PC may store the session secret key in hard disk or other nonvolatile storage medium; if the session secret key is valid, the PC is capable of logging in the APID-A at the service party A directly by means of the session secret key (such as using the browser supporting Cookie) with no need for that the user passes the identity authentication on the terminal by inputting a user verification information or by using a user verification device or that the user passes the indirect authentication of a third party.

The second step, when the user is logging in the AUID at the authentication center by using a terminal or by a terminal's authentication program issued by the authentication center, the authentication center sends the requests for refreshing the login status to the corresponding service parties associated with the AUID (such as service party A and service party B), and then after different service parties (such as A and B) receives the requests for refreshing the login status, each of the different service parties returns the login status of different terminals which the user used or is using logging in the service party to the authentication center or of different programs on different terminals logging in the service party to the authentication center (for example: the login status of the PC and the mobile phone logging in the APID-A at the service party A and the APID-B at the service party B are all valid currently, and also the login status of different specific programs on the PC and mobile phone logging in the APID-A at the service party A and the APID-B at the service party B are all valid currently).

After the user logs in the authentication center by using a terminal, the service parties send the login status or the session status to the authentication center. When the user logs in the AUID which the user has at the authentication center by using a terminal and requests for refreshing the information of the status, the service parties send the login status or the session status to the authentication center. When the login status or the session status of the terminal used by the user logging in the APID which the user has at a service party changes, the service party sends the refreshed login status or the session status to the authentication center.

After the user logs in the authentication center by using a current terminal, the authentication center sends the login status of different terminals used by the user logging in the authentication center to the current terminal used by the user.

The third step, authentication center sends the login status received to the terminal which the user is using and which has logged in the AUID or to the authentication program on the terminal. On the terminal's interface which has logged in the authentication center, the user is capable of seeing the list of the login status or the session status of different terminals which the user used or is using logging in the APIDs which the user has at different service parties or the list of the login status or the session status of different programs on different terminals logging in the APIDs which the user has at different service parties.

When the login status of different terminals used by the user logging in different service parties changes or when the login status of different programs on different terminals used by the user logging in different service parties changes, the corresponding service party sends the changed login status to the authentication center and then the authentication center sends the status to the user's terminal, for example: the user may choose to exit the login on the mobile phone's interface which has logged in the service party A or on the mobile phone's specific program's interface which has logged in the service party A, and the service party A sends the information of the invalid login status of the user's mobile phone to the authentication center, and then the authentication center sends the invalid login status to the user's current terminal which has logged in the authentication center, and then the user is capable of seeing the update of the login status of the terminals used by the user in real time. The user may choose on the terminal's interface which has logged in the authentication center to update the login status of a specific service party or of a specific terminal or of a specific program.

The forth step, on the interface which has logged in the authentication center, the user is capable of setting to change or stop or invalidate the login status or the session status of different terminals used by the user logging in the APIDs which the user has at different service parties or of different programs on different terminals used by the user logging in the APIDs which the user has at the different service parties. And the setting to change includes setting to make the login status or session valid or invalid or pause. For example: the interface of the PC or tablet computer used by the user has currently logged in the AUID of the authentication center, and the user sets on the interface to invalidate the login status of the mobile phone or a program on the mobile logging in the APID-A at the service party A, and then the authentication center sends the invalidation instruction to the service party A, and after the service party A receives the invalidation instruction, the service party A deletes or invalidates the session secret key which is generated by the service party A for the user's mobile phone or for the program on the mobile phone, and then the mobile phone of the user or the program is not capable of logging in the user's APID-A directly (the login status is invalid) when reconnecting to the address of the service party A, and then before the user's mobile phone or the program on the mobile phone is capable of logging in the APID-A again (the login status is capable of becoming valid again), the user must pass the identity authentication of the service party A on the mobile phone by inputting a user verification information or by using a user verification device. In the same way, on the interface which has logged in the authentication center, the user is capable of setting the login status or the session status of the PC or a specific program on the PC logging in the service party A and the service party B.

After the user logs in the APID which the user has at a service party by using a specific program on a terminal, the terminal or the specific program sends the terminal's "terminal identification information" to the service party, and the "terminal identification information" includes or is accompanied by the "program identification information". For example: the user logs in the APID which the user has at a service party by using the Microsoft browser on a PC used by the user, and the browser sends the name "somebody's home PC" set for the PC by the user and the name "Microsoft browser" set for the browser by the user together to the service party, and then the service party sends the names of the PC and the browser to the authentication center, and then the authentication center sends the names of the PC and the browser together to the authentication program which has logged in the AUID which the user has at the authentication center and which is running on a terminal of the user, and then the user is capable of seeing the login status of different programs on different terminals used by the user logging in the APIDs which the user has at the different service parties—the user is capable of seeing that the user logs in his own APID at the service party by using the "Microsoft browser" on the PC "somebody's home PC". And the name of the PC "somebody's home PC" is the "terminal identification information", and the name of the browser "Microsoft browser" is the "program identification information", or the name of the PC and the name of the browser together form the "terminal identification information".

The user is capable of using an authentication program to log in the AUID which the user has at the authentication center, and the authentication program on a terminal stores the "terminal identification information" of the terminal. The user requests and logs in the APID which the user has at a service party by using the authentication program which has logged in the AUID, and the authentication program sends the "terminal identification information" of the terminal to a specific program by which on the terminal the user logs in the service party, and the specific program sends the "terminal identification information" to the service party.

The user is capable of logging in the AUID which the user has at the authentication center by using the authentication program, and the authentication program on the terminal stores the "program identification information" of the specific program by which the user logs in the APID which the user has at the service party. The user starts the specific program by using the authentication program which has logged in the AUID, and the user uses the specific program to request and log in the APID which the user has at the service party, and the authentication program sends the "program identification information" of the specific program to the specific program by which the user logs in the service party, and the specific program sends the "program identification information" to the service party. In this case, the "terminal identification information" includes the "program identification information".

Or a terminal's specific program by which the user logs in the APID at a service party stores the "program identification information" of the specific program on the terminal, and the specific program sends the "program identification information" to the service party when the user logs in the service party by using the specific program of the terminal. In this case, the "terminal identification information" may be accompanied by the "program identification information", and that is to say, the "program identification information" may accompany the "terminal identification information" to be sent from the user's terminal to the service party.

After a user logs in the AUID of the authentication center by using the current terminal, the authentication center is capable of sending the login status or the session status of different terminals used by the user logging in the APIDs which the user has at different service parties to the current terminal used by the user. On the current terminal's interface which has logged in the AUID which the user has at the authentication center, the user is capable of changing or stopping or disabling the login status or the session status of different terminals used by the user logging in the APIDs which the user has at different service parties.

A user is capable of setting at the authentication center to permit or forbid a specific terminal to log in the APID which the user has at a specific service party. And the specific terminal may be the terminal not registered on the authentication center or the terminal not associated with the AUID which the user has at the authentication center or the terminal of a specific type or a specific terminal or all terminals. When a user logs in the APID which the user has at a service party by using a terminal, the service party sends the "terminal identification information" of the terminal to the authentication center, and then the authentication center returns a confirmation to the service party and the confirmation permits or forbids the login, or when a terminal of a user has logged in the authentication center first and then is logging in the APID which the user has at a service party by using the authentication center, the authentication center decides directly if the login is permitted. For example: a user is capable of setting at the authentication center to permit or forbid the mobile terminal to log in the user's account at a payment platform.

A user is capable of setting at the authentication center to forbid a terminal which is not registered on the authentication center or not associated with the AUID which the user has at the authentication center to log in the APID which the user has at a specific service party or the APIDs which the user has at all service parties.

A user is capable of making a setting at the authentication center or the authentication center is capable of making a setting automatically by default, and the setting is that a specific terminal must log in the APID which the user has at a specific service party by using the authentication center or a specific terminal is capable of logging in the APID which the user has only when the user has logged in the AUID which the user has by the authentication program. And the specific terminal may be the terminal not registered on the authentication center or the terminal not associated with the AUID which the user has at the authentication center or the terminal of a specific type or a specific terminal or all terminals. For example: when a user logs in the APID which the user has at a service party by using a specific terminal, the specific terminal must request and get the authentication credential for this login from the authentication center, and then the specific terminal transfers the authentication credential to the service party, and only after the service party verifies that the authentication credential is correct, the service party will permit the specific terminal to log in the user's APID.

A user is capable of setting at the authentication center to permit or forbid a specific terminal to use a specific function of a specific service party. And the specific terminal may be the terminal not registered on the authentication center or the terminal not associated with the AUID which the user has at the authentication center or the terminal of a specific type or a specific terminal or all terminals. For example, a user is capable of setting at the authentication center to forbid the mobile terminal to pay or transfer accounts through the user's account at a third-party payment platform.

After a user logs in the AUID at the authentication center by using a current terminal, the authentication center is capable of sending the login status or the session status of different programs used by the user logging in the APIDs which the user has at different service parties to the current terminal used by the user, and on the current terminal's interface which has logged in the AUID which the user has at the authentication center, the user is capable of changing or stopping or disabling the login status or the session status of different programs used by the user logging in the APIDs which the user has at different service parties.

After a user logs in the AUID at the authentication center by using a current terminal, the authentication center is capable of sending the login status or the session status of different programs on different terminals used by the user logging in the APIDs which the user has at different service parties to the current terminal used by the user, and on the current terminal's interface which has logged in the AUID which the user has at the authentication center, the user is capable of changing or stopping or disabling the login status or the session status of different programs on different terminals used by the user logging in the APIDs which the user has at different service parties.

A user is capable of setting at the authentication center to permit or forbid a specific program or a specific program on a specific terminal to log in the APID which the user has at a specific service party.

A user is capable of setting at the authentication center to forbid a specific program on a specific terminal or a specific program which is not registered on the authentication center or not associated with the AUID which the user has at the authentication center to log in the APID which the user has at a specific service party or to log in the APIDs which the user has at all service parties.

A user is capable of making a setting at the authentication center or the authentication center is capable of making a setting automatically by default, where the setting is that a specific program on a specific terminal or a specific program must log in the APID which the user has at a specific service party by using the authentication center or that a specific program on a specific terminal or a specific program is capable of logging in the APID which the user has at a specific service party only when the user has logged in the AUID which the user has at the authentication center by using the authentication program.

A user is capable of setting at the authentication center to permit or forbid a specific program on a specific terminal or a specific program to use a specific function of a specific service party.

The program in this invention is a functional software, for example: a browser or an application program or a special program.

Each time a user uses a terminal to reconnect and log in a service party, the terminal sends the "terminal identification information" of the terminal or the "terminal service party identification information" of the terminal to the service party. And the service party is capable of getting the "terminal identification information" of the terminal from the "terminal service party identification information" of the terminal. And the connection refers to generalized connection, which includes the connection based on the identification information and the connection based on the network addresses, for example: the session connection based on the identification information and the TCP connection based on the network addresses. Or the connection may refer to the connection based on the network addresses mapping, for example: the connection based on TCP or IP addresses. And the service party stores the "terminal service party identification information" of the terminal. And the "terminal identification information" may be stored on the terminal, or may be transferred from the authentication center to the terminal and then be transferred from the terminal to the service party, or may be input into the terminal by the user. And the "terminal identification information" or the "terminal service party identification information" may be set by the user or be generated by the authentication center or be the feature information of the terminal itself.

Different service parties are separate from each other and don't need to trust each other and have no trust relationship to each other. There is no mutual membership relation to each other between a service party and the authentication center. A service party and the authentication center are the entities operating separately. The communication path or route of the separate connection which a user establishes to a service party by using a terminal doesn't include or doesn't pass through the authentication center. The communication path or route of the separate connection which a user establishes to the authentication center by using a terminal doesn't include or doesn't pass through a service party.

A terminal's interface which has logged in the AUID which a user has at the authentication center is capable of displaying the specific account information of the APIDs which the user has at different service parties, and the user is capable of changing the specific account information of the APIDs which the user has at different service parties on the terminal's interface which has logged in the AUID which the user has at the authentication center.

The specific account information includes a user's contact information, and the user's contact information includes the user's mobile number and/or the user's email address. And the user's contact information may include the user's contact address too.

The specific account information includes a user's head portrait and/or nickname.

Embodiment 2

In this embodiment, the authentication center is the server (group) of a service provider which provides login information service through internet. The service party A and the service party B are the two separate websites which trust the authentication center, and the terminals are mobile phone, PC and tablet computer.

Firstly, the following Preposed-step is required to be carried out and needs to be carried out only once. And this Preposed-step is the preposed prerequisite for the subsequent steps.

Preposed-step: a user registers APID-A at the service party A and registers APID-B at the service party B and registers AUID at the authentication center, and then at the service party A and B, the user associates APID-A and APID-B with AUID separately, and the service party A and B send the association notifications to the authentication center to confirm separately. For example: after the user logs in the service party A, the user sends the AUID which the user has at the authentication center to the service party A; and the service party A sends the user's APID-A and AUID together to the authentication center; and if the authentication center confirms that the AUID exists, the authentication center stores APID-A and AUID correspondingly and returns association confirmation to the service party A; and after the service party A receives the association confirmation, the service party A stores the AUID and the user's APID-A correspondingly; and the service party A returns the message of association success to the authentication center. For another example: after the user logs in the authentication center by using a terminal, the user sends the APID which the user has at the service party to the authentication center; and the authentication center stores the APID and the AUID which the user has correspondingly; and the authentication center sends the notification of the association to the APID's service party; and after the service party receives the notification, the service party stores the APID and the AUID which the user has correspondingly too and returns the association confirmation to the authentication center.

The user has logged in the authentication center by using the mobile phone, PC and tablet computer, and when each of the user's mobile phone, PC and tablet computer logs in the authentication center for the first time, the authentication center generates the "terminal identification code" for each of them separately. The authentication center sends the corresponding "terminal identification code" to each of the user's mobile phone, PC and tablet computer. The program which is on the user's terminal and which is used by the user to log in the authentication center stores the "terminal identification code" in the nonvolatile memory (flash memory or hard disk) of each of the user's mobile, PC and tablet computer. The user is capable of setting the "terminal user identification information" of different terminals when the user has logged in the authentication center, and the authentication center stores the "terminal user identification information" of a terminal and the "terminal identification information" of the same terminal correspondingly.

Then the following steps are capable of being carried out.

The first step. The user logs in the APID-A of the service party A by using the PC and the mobile phone separately. The PC and the mobile phone maintain the valid login status logging in the service party A at the same time. The user logs in the APID-B of the service party B by using the PC and the mobile phone separately. The PC and the mobile phone maintain the valid login status of logging in the service party B at the same time. If the user has not made the PC and the mobile phone exit from the logins logging in the service party A and the service party B, when the user opens the addresses of the service party A and B by using the PC or the mobile phone, the user is capable of logging in the APID-A and APID-B directly with no need for that the user passes the identity authentication on the terminal by inputting a user verification information or using a user verification device or with no need for that the user passes the indirect authentication of the third party. The valid login status is maintained by the session between the terminal (PC, mobile phone) and the service party (A, B), for example: after the user logs in the service party A by using the PC, the service party A generates a session secret key to send to the PC, and the PC may store this session secret key in the hard disk or other nonvolatile storage medium, and if the session secret key is valid, the PC is capable of logging in the APID-A of the service party A directly by means of the session secret key.

Each of user's mobile phone and PC sends its own "terminal identification code" to each of the service party A and the service party B when logging in each of the service party A and the service party B, and each of the service party A and the service party B stores the "terminal identification code" of each of the mobile phone and the PC with the corresponding conversation secret key together.

The second step. When the user uses the PC or the tablet computer to log in the AUID at the authentication center, the authentication center sends the requests for updating the login status logging in the AUID's corresponding service parties (service party A and service party B in this embodiment). After each of the service party A and the service party B receives the request for updating the login status, each of the service party A and the service party B returns the login status of the PC and the mobile phone which are used by the user logging in the service party A or the service party B to the authentication center: the login status of the PC and the mobile phone logging in the APID-A at the service party A and the APID-B at the service party B are all valid.

Each login status which the service party A and the service party B send to the authentication center includes the "terminal identification information" of the user's mobile phone or PC.

Each of the service party A and B is capable of sending other related information of the APID which the user has to the authentication center.

The third step. The authentication center sends the login status received to the user's PC or tablet computer which has logged in the AUID. Each login status includes the "terminal identification information" or the "terminal user identification information" of the user's mobile phone or PC (which depends on if the user has set the "terminal user identification information" in the authentication center before).

And the authentication center sends the login status of different terminals used by the user currently logging in the AUID which the user has at the authentication center to the PC or the tablet computer used by the user. At the moment the login status of the PC or the tablet computer used by the user logging in the authentication center is valid, and the login status of the user's other terminals logging in the authentication center are invalid.

And the authentication center is capable of sending the other related information to the user's current terminal.

The forth step. On the interface which has logged in the AUID which a user has at the authentication center, the user is capable of seeing and set (change or stop or invalidate) the login status or the session status of different terminals used by the user logging in the APIDs the user has at different service parties. The user is capable of distinguishing different terminals by the "terminal identification information" or the "terminal user identification information" in the list of the login status. The setting "change" includes making the login status or session status valid or invalid or pause. For example: on the interface which is of the PC or the tablet computer currently used by the user and which has logged in the AUID of the authentication center, the user sets to invalidate the login status of the mobile phone logging in the APID-A of the service party A, and the authentication center sends the instruction to the service party A, and the service party A invalidates or deletes the session secret key which the service party A generates for the user's mobile phone, and after that the mobile phone of the user is not capable of logging in the APID-A directly (the login status is invalid) when reconnects the address of the service party A, and before the mobile phone of the user is capable of reentering the APID-A (the login status is capable of being valid again), the user must pass the identity authentication of the service party A by inputting a user verification information again or using a user verification device again or passing the indirect authentication of a third party. Similarly on the interface of the authentication center, the user is capable of setting the login status of the PC logging in the service party A and B. When the login status of one of different terminals used by the user logging in one of different service parties changes, the service party sends the changed login status to the authentication center, and the authentication center sends it to the user's terminal, for example: the user may choose to exit the login on the mobile phone's interface which has logged in the service party A, and the service party A sends the information of the invalidation of the login status of the user's mobile phone to the authentication center, and the authentication center sends the information of the invalidation of the status to the user's current terminal which has logged in the authentication center, and the user is capable of seeing the real-time update of the login status of the terminals used by the user. And on a terminal's interface which has logged in the authentication center, the user may choose to update the login status of a specific service party or a specific terminal.

On a terminal's interface which has logged in the authentication center, the user is capable of setting the login status of different terminals logging in the authentication center.

Embodiment 3

In this embodiment, the user's terminal passes the third party authentication of the authentication center to log in a service party. There are a lot of technical schemes of this kind, and this embodiment is only a typical scheme.

In this embodiment, the authentication center is the server (group) of a service provider which provides login information service through internet, and the service party A and the service party B are the two separate websites which trust the authentication center, and the user's terminals are mobile phone and PC.

Firstly a Preposed-step needs to be carried out, and the Preposed-step is the preposed prerequisite of the subsequent steps, and the Preposed-step needs to be carried out only once and the subsequent steps are capable of being carried out repeatedly.

Preposed-step: a user registers APID-A at the service party A and registers APID-B at the service party B and registers AUID at the authentication center, and then at the service party A and B, the user associates APID-A and APID-B to AUID separately, and the service party A and B send the association notifications to the authentication center separately to confirm. For example: after the user logs in the service party A, the user sends the AUID which the user has at the authentication center to the service party A; and the service party A sends the user's APID-A and AUID together to the authentication center; and if the authentication center confirms that the AUID exists, the authentication center stores APID-A and AUID correspondingly and returns association confirmation to the service party A; and after the service party A receives the association confirmation, the service party A stores the AUID and the user's APID-A correspondingly; and the service party A returns the message of association success to the authentication center. For another example: after the user logs in the authentication center by using a terminal, the user sends the APID which the user has at a service party to the authentication center; and the authentication center stores the APID and the AUID which the user has correspondingly; and the authentication center sends the notification of the association to the APID's service party; and after the service party receives the notification, the service party stores the APID and the AUID which the user has correspondingly too and returns the association confirmation to the authentication center.

The user runs an authentication program on a terminal to connect the authentication center to register and log in. The authentication program may be a special program released by the authentication center or may be a browser.

The user logs in the authentication center by using the mobile phone and the PC, and when each of the user's mobile phone and PC logs in the authentication center for first time, the authentication center generates the "terminal identification information" for the mobile phone or the PC separately (or the user set the "terminal identification information" on the interface which has logged in the authentication center). And the authentication center sends the "terminal identification code" to each of the user's mobile phone and PC separately, and the program which is used to log in the authentication center on the user's terminal stores the "terminal identification code" in the nonvolatile memory (flash memory of hard disk) separately. After logged in the authentication center, the user may also set the "terminal user identification information" for each of different terminals, and the authentication center stores the "terminal user identification information" of a terminal and "terminal identification information" of the same terminal correspondingly.

Then the following steps are capable of being carried out.

The first step, after the user logs in the AUID at the authentication center by using the authentication program on the user's PC or mobile phone, the authentication center sends the different service parties' APIDs associated with the AUID to the authentication program.

The authentication center and the authentication program on the terminal store the "terminal identification information". After the user logs in the authentication center by using the authentication program on a terminal, the terminal sends the "terminal identification information" to the authentication center. The authentication center stores the "terminal user identification information" which is corresponding to the "terminal identification information" and which is set by the user for the terminal. For example: on the authentication program's interface which has logged in the authentication center, the user is capable of setting the "terminal user identification information" (such as "my mobile phone", "my office computer" and "my home computer") for different terminals, and such "terminal user identification information" is stored corresponding to the "terminal identification information" at the authentication center.

The second step, the user chooses the APID which the user wants to log in in the list of APIDs on the authentication program's interface on the user's PC or mobile phone, and the user passes the identity authentication of the service party through the indirect authentication of the authentication center, and so the user is capable of logging in the APID at one of different service parties by one click. In this embodiment, the authentication center sends a verification credential to a service party through the authentication program on the terminal, and the service party verifies the verification credential by the means of the authentication center's public secret key owned by the service party (the authentication center owns the corresponding private secret key) or by the means of sending the verification credential to the authentication center to verify, and if the verification credential is correct, the service party permits the user's terminal to log in the APID. The program which the user uses to log in the APID of the service party is the authentication program or other program which is not the authentication program. For example: the authentication program is a browser, and after the authentication program receives the verification credential, the authentication program sends the verification credential to a service party in a new page's request for login. For example: the authentication program is a special program issued by the authentication center and dedicated to the authentication center (the special program is not a browser), and after the authentication program receives the verification credential, the authentication program opens a new page of a browser or start a program which is dedicated to a service party, and the authentication program sends the verification credential to the service party to request for login through the page of the browser or the program which is dedicated to the service party.

When the user requests for logging in a service party by using the authentication program, the authentication program sends the credential together with the terminal's "terminal identification information" to the service party, and the service party stores the "terminal identification information" together with the session secret key correspondingly. And the "terminal identification information" is stored on the terminal by the authentication program, or the "terminal identification information" is stored by the authentication center and sent by the authentication center to the authentication program after the authentication center identifies the terminal.

In this embodiment, the user logs in the APID-A at the service party A by using PC and mobile phone separately, and the PC and the mobile phone maintain the valid login status of the PC and the mobile phone logging in the service party A. The user also logs in the APID-B at the service party B by using the PC and the mobile phone separately, and the PC and the mobile phone maintain the valid login status of the PC and the mobile phone logging in the service party B. And if the user doesn't make the PC and the mobile phone exit the login logging in the service party A and B, the user is capable of logging in APID-A and APID-B directly with no need to input a user verification information or to use a user verification device to pass the identity authentication and with no need to pass the indirect authentication of the authentication center. And a valid login status is maintained by a valid session between the terminal (PC, mobile phone) and the service party (A, B), for example: after the user logs in the service party A by using the PC, and the service party A generates a session secret key and sends it to the PC, and the PC stores the session secret key in the hard disk or other nonvolatile storage medium, and if the session secret key is valid, the PC is capable of logging in the APID-A at the service party A directly by the means of the session secret key.

The third step, the user is capable of operating on the authentication program's interface on the PC to choose to exit or shut down the authentication program on the PC to make the authentication program on the PC exit the login logging in the authentication center.

The forth step. The user logs in the AUID at the authentication center by using the authentication program on the PC or the tablet computer, and after the user logs in the authentication center, the authentication center sends the requests for refreshing the login status to the service party A and the service party B, and each of the service party A and the service party B sends separately the login status of the PC and the mobile phone used by the user logging in the service party A or the service party B to the authentication center, and the authentication center sends the login status of the PC and the mobile used by the user logging in the APIDs at the service party A and the service party B together with the login status of the PC and the mobile phone used by the user logging in the AUID at the authentication center to the authentication program on the terminal which the user is using currently, and the user is capable of operating on the interface of the authentication program to change the login status of the PC and the mobile phone used by the user logging in the authentication center. For example, the user can make the login status of the mobile phone logging the service party A and the service party B invalid, and the user can also make the login status of the mobile phone logging in the authentication center invalid, and then the user is not capable of using the mobile phone to log in the service party A, the service party B or the authentication center directly with no need for the user identity authentication or the indirect authentication of a third party (the authentication center), and the user must use the mobile phone to pass the identity authentication or pass the indirect authentication of a third party to make the mobile phone to log in the service party A, the service party B or the authentication center. In this embodiment, the means by which the user passes the identity authentication of the authentication center may be the means of username-password, the agreed code input by the user, or the portable external IC card.

Each status sent by the service party A and B to the authentication center includes the "terminal identification information" of the mobile phone or the PC of the user.

Each of service party A and B sends other related information of the APID which the user has to the authentication center, and the authentication center sends the other related information to the terminal which the user is using currently.

The user is capable of setting at the authentication center to permit or forbid a specific terminal to log in the APID which the user has at a specific service party. And the user is capable of setting at the authentication center to forbid the terminal which has not registered on the authentication center or which has not associated with the AUID of the authentication center to log in the APID which the user has at a specific service party or the APIDs which the user has at all service parties.

When the user is logging in the APID which the user has at a specific service party or at anyone of all service parties by using a terminal which is not registered on the authentication center or not associated with the AUID which the user has at the authentication center, the authentication center sends the request for confirmation to the user, and only after the user confirms to the authentication center, the terminal is capable of logging in the user's APID.

The user is capable of setting at the authentication center to permit or forbid a specific terminal to use a specific function of a specific service party. And the specific terminal may be the terminal which is not registered on the authentication center or the terminal which is not associated with the AUID which the user has at the authentication center or a specific type of terminals or a specific terminal. For example, the user is capable of setting at the authentication center to forbid the mobile terminal to pay or transfer accounts through the user's account at a specific third-party payment platform. For another example, the user is capable of setting at the authentication center to forbid the terminal which is not registered on the authentication center or which is not associated with the AUID which the user has at the authentication center to use the function of payment or transferring accounts of the APID which the user has at a third-party payment platform.

Additional Description for the Embodiments (1-3)

The embodiments (1-3) may have any step or characteristic applicable in the following description besides the description above, or technical personnel in the field may transform or change the embodiments according to any step or characteristic applicable in the following description to realize this invention in the way different from the description above. The realizations or embodiments of this invention are impossible to be exhausted in this invention description, but the technical personnel in the field may transform or change the schemes of this invention according to the following description and these schemes transformed or changed obviously belong to the scope which this invention description has disclosed or supported.

A system or method for authentication center includes an authentication center, service parties, users and terminals, and the terminals are connected with the authentication center and the service parties by a network and are capable of communicating with them, where a user has a user account AUID at the authentication center, and a user has a user account APID at a service party, and a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately, where the authentication center stores the corresponding relationships between the AUID of a user and the APIDs which the user has at different service parties, where a service party is capable of sending the login status or the session status of different terminals used by a user logging in the APID which the user has at the service party to the authentication center, where after a user logs in the AUID at the authentication center by using a current terminal, the authentication center is capable of sending the login status or the session status of different terminals used by the user logging in the APIDs which the user has at different service parties to the current terminal used by the user, where on the current terminal's interface which has logged in the AUID which the user has at the authentication center, the user is capable of changing or stopping or disabling the login status or the session status of different terminals used by the user logging in the APIDs which the user has at different service parties.

The terminals, the service parties and the authentication center are connected through internet.

On the interface which has logged in the AUID which a user has at the authentication center, the user is capable of seeing and set (change or stop or invalidate) the login status or the session status of different terminals used by the user logging in the user's APIDs at different service parties.

A system or method for authentication center includes an authentication center, service parties, users and terminals, and the terminals are connected with the authentication center and the service parties through a network and are capable of communicating with them, where a user has a user account AUID at the authentication center, and a user has a user account APID at a service party, and a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately, where the authentication center stores the corresponding relationships between the AUID of a user and the APIDs which the user has at different service parties, where a user is capable of setting at the authentication center to permit or forbid a specific terminal to log in the APID which the user has at a specific service party.

A system or method for authentication center includes an authentication center, service parties, users and terminals, and the terminals are connected with the authentication center and the service parties through a network and are capable of communicating with them, where a user has a user account AUID at the authentication center, and a user has a user account APID at a service party, and a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately, where the authentication center stores the corresponding relationships between the AUID of a user and the APIDs which the user has at different service parties, where a user is capable of setting at the authentication center to forbid the terminal which is not registered on the authentication center or which is not associated with the AUID which the user has at the authentication center to log in the APID which the user has at a specific service party or the APIDs which the user has at all service parties.

A system or method for authentication center includes an authentication center, service parties, users and terminals, and the terminals are connected with the authentication center and the service parties through a network and are capable of communicating with them, where a user has a user account AUID at the authentication center, and a user has a user account APID at a service party, and a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately, where the authentication center stores the corresponding relationships between the AUID of a user and the APIDs which the user has at different service parties, where a user is capable of making a setting at the authentication center or the authentication center is capable of making a setting automatically by default, where the setting is that a specific terminal must log in the APID which the user has at a specific service party by using the authentication center or that a specific terminal is capable of logging in the APID which the user has at a specific service party only when the user has logged in the AUID which the user has at the authentication center by the authentication program.

A system or method for authentication center includes an authentication center, service parties, users and terminals, and the terminals are connected with the authentication center and the service parties through a network and are capable of communicating with them, where a user has a user account AUID at the authentication center, and a user has a user account APID at a service party, and a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately, where the authentication center stores the corresponding relationships between the AUID of a user and the APIDs which the user has at different service parties, where a user is capable of setting at the authentication center to permit or forbid a specific terminal to use a specific function of a specific service party.

A system or method for authentication center includes an authentication center, service parties, users and terminals, and the terminals are connected with the authentication center and the service parties through a network and are capable of communicating with them, where a user has a user account AUID at the authentication center, and a user has a user account APID at a service party, and a user is capable of using a terminal to establish a separate connection with the authentication center and a separate connection with a service party separately, and the user is capable of using the terminal to log in the AUID which the user has at the authentication center through the separate connection with the authentication center and to log in the APED which the user has at the service party through the separate connection with the service party separately, where the authentication center stores the corresponding relationships between the AUID of a user and the APIDs which the user has at different service parties, where a service party is capable of sending the login status or the session status of different programs used by a user logging in the APID which the user has at the service party to the authentication center, where after a user logs in the AUID at the authentication center by using a current terminal, the authentication center is capable of sending the login status or the session status of different programs used by the user logging in the APIDs which the user has at different service parties to the current terminal used by the user, where on the current terminal's interface which has logged in the AUID which the user has at the authentication center, the user is capable of changing or stopping or disabling the login status or the session status of different programs used by the user logging in the APIDs which the user has at different service parties.

A system or method for authentication center includes an authentication center, service parties, users and terminals, and the terminals are connected with the authentication center and the service parties through a network and are capable of communicating with them, where a user has a user account AUID at the authentication center, and a user has a user account APID at a service party, and a user is capable of using the terminal to establish a separate connection with the authentication center and a separate connection with a service party separately, and the user is capable of using the terminal to log in the AUID which the user has at the authentication center through the separate connection with the authentication center and to log in the APID which the user has at the service party through the connection with service party separately, where the authentication center stores the corresponding relationships between the AUID of a user and the APIDs which the user has at different service parties, where a service party is capable of sending the login status or the session status of different programs on different terminals used by a user logging in the APID which the user has at the service party to the authentication center, where after a user logs in the AUID at the authentication center by using a current terminal, the authentication center is capable of sending the login status or the session status of different programs on different terminals used by the user logging in the APIDs which the user has at different service parties to the current terminal used by the user, where on the current terminal's interface which has logged in the AUID which the user has at the authentication center, the user is capable of changing or stopping or disabling the login status or the session status of different programs on different terminals used by the user logging in the APIDs which the user has at different service parties.

A system or method for authentication center includes an authentication center, service parties, users and terminals, and the terminals are connected with the authentication center and the service parties through a network and are capable of communicating with them, where a user has a user account AUID at the authentication center, and a user has a user account APID at a service party, and a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately, where the authentication center stores the corresponding relationships between the AUID of a user and the APIDs which the user has at different service parties, where a user is capable of setting at the authentication center to permit or forbid a specific program on a specific terminal or a specific program to log in the APID which the user has at a specific service party.

A system or method for authentication center includes an authentication center, service parties, users and terminals, and the terminals are connected with the authentication center and the service parties through a network and are capable of communicating with them, where a user has a user account AUID at the authentication center, and a user has a user account APID at a service party, and a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately, where the authentication center stores the corresponding relationships between the AUID of a user and the APIDs which the user has at different service parties, where a user is capable of setting at the authentication center to forbid a specific program on a specific terminal or a specific program which is not registered on the authentication center or which is not associated with the AUID which the user has at the authentication center to log in the APID which the user has at a specific service party or to log in the APIDs which the user has at all service parties.

A system or method for authentication center includes an authentication center, service parties, users and terminals, and the terminals are connected with the authentication center and the service parties through a network and are capable of communicating with them, where a user has a user account AUID at the authentication center, and a user has a user account APID at a service party, and a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately, where the authentication center stores the corresponding relationships between the AUID of a user and the APIDs which the user has at different service parties, where a user is capable of making a setting at the authentication center or the authentication center is capable of making a setting automatically by default, where the setting is that a specific program on a specific terminal or a specific program must log in the APID which the user has at a specific service party by using the authentication center or the setting is that a specific program on a specific terminal or a specific program is capable of logging in the APID which the user has at a specific service party only when the user has logged in the AUID which the user has at the authentication center by the authentication program.

A system or method for authentication center includes an authentication center, service parties, users and terminals, and the terminals are connected with the authentication center and the service parties through a network and are capable of communicating with them, where a user has a user account AUID at the authentication center, and a user has a user account APID at a service party, and a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately, where the authentication center stores the corresponding relationships between the AUID of a user and the APIDs which the user has at different service parties, where a user is capable of setting at the authentication center to permit or forbid a specific program on a specific terminal or a specific program to use a specific function of a specific service party.

A user is capable of using different terminals to log in a service party.

A user is capable of using different terminals to log in the authentication center.

A user is capable of using different programs or using different programs on different terminals to log in a service party.

A user is capable of using different programs or using different programs on different terminals to log in the authentication center.

After a user logs in the AUID which the user has of the authentication center by using a current terminal, the authentication center is capable of sending the login status or the session status of different terminals used by the user logging in the APIDs which the user has at different service parties to the current terminal used by the user. On the current terminal's interface which has logged in the AUID which the user has at the authentication center, the user is capable of changing or stopping or disabling the login status or the session status of different terminals used by the user logging in the APIDs which the user has at different service parties.

A user is capable of setting at the authentication center to permit or forbid a specific terminal to log in the APID which the user has at a specific service party. And the specific terminal may be the terminal not registered on the authentication center or the terminal not associated with the AUID which the user has at the authentication center or the terminal of a specific type or a specific terminal or all terminals. When a user is logging in the APID which the user has at a service party by using a terminal, the service party sends the "terminal identification information" to the authentication center, and then the authentication center returns a confirmation to the service party and the confirmation permits or forbids the login, or when a terminal of a user has logged in the authentication center first and then is logging in the APID which the user has at a service party by using the authentication center, the authentication center decides directly if the login is permitted. For example: a user is capable of setting at the authentication center to permit or forbid the mobile terminal to log in the user's account at a payment platform.

A user is capable of setting at the authentication center to forbid a terminal which is not registered on the authentication center or not associated with the AUID which the user has at the authentication center to log in the APID which the user has at a specific service party or the APIDs which the user has at all service parties.

A user is capable of making a setting at the authentication center or the authentication center is capable of making a setting automatically by default, where the setting is that a specific terminal must log in the APID which the user has at a specific service party by using the authentication center or that a specific terminal is capable of logging in the APID which the user has only when the user has logged in the AUID which the user has by the authentication program. And the specific terminal may be the terminal not registered on the authentication center or the terminal not associated with the AUID which the user has at the authentication center or the terminal of a specific type or a specific terminal or all terminals. For example: when a user logs in the APID which the user has at a service party by using a specific terminal, the specific terminal must request and get the authentication certificate from the authentication center which is generated by the authentication center for this login, and then the specific terminal transfers the authentication certificate to the service party, and only after the service party verifies that the authentication certificate is correct, the service party will permit the specific terminal to log in the user's APID.

A user is capable of setting at the authentication center to permit or forbid a specific terminal to use a specific function of a specific service party. And the specific terminal may be the terminal not registered on the authentication center or the terminal not associated with the AUID which the user has at the authentication center or the terminal of a specific type or a specific terminal or all terminals. For example, a user is capable of setting at the authentication center to forbid a mobile terminal to pay or transfer accounts through the user's account at a third-party payment platform.

A service party is capable of sending the login status or the session status of different programs used by a user logging in the APIDs which the user has at the service party to the authentication center. And after a user logs in the AUID at the authentication center by using a current terminal, the authentication center is capable of sending the login status or the session status of different programs used by the user logging in the APIDs which the user has at different service parties to the current terminal used by the user. And on the current terminal's interface which has logged in the AUID which the user has at the authentication center, the user is capable of changing or stopping or disabling the login status or the session status of different programs used by the user logging in the APIDs which the user has at different service parties.

A service party is capable of sending the login status or the session status of different programs on different terminals used by a user logging in the APIDs which the user has at the service party to the authentication center. And after a user logs in the AUID of the authentication center by using a current terminal, the authentication center sends the login status or the session status of different programs on different terminals used by the user logging in the APIDs which the user has at different service parties to the current terminal used by the user. And on the current terminal's interface which has logged in the AUID which the user has at the authentication center, the user is capable of changing or stopping or disabling the login status or the session status of different programs on different terminals used by the user logging in the APIDs which the user has at different service parties.

A user is capable of setting at the authentication center to permit or forbid a specific program on a specific terminal or a specific program to log in the APID which the user has at a specific service party.

A user is capable of setting at the authentication center to forbid a specific program on a specific terminal or a specific program which is not registered on the authentication center or which is not associated with the AUID which the user has at the authentication center to log in the APID which the user has at a specific service party or to log in the APIDs which the user has at all service parties.

A user is capable of making a setting at the authentication center or the authentication center is capable of making a setting automatically by default, where the setting is that a specific program on a specific terminal or a specific program must log in the APID which the user has at a specific service party by using the authentication center or that a specific program on a specific terminal or a specific program is capable of logging in the APID which the user has at a specific service party only when the user has logged in the AUID which the user has at the authentication center by the authentication program.

A user is capable of setting at the authentication center to permit or forbid a specific program on a specific terminal or a specific program to use a specific function of a specific service party.

A program in this invention is a functional software, for example: a browser or an application program or a special program.

When a user logs in the APID which the user has at a specific service party or anyone of the APIDs which the user has at all service parties by using a terminal not registered on the authentication center or by using a terminal not associated with the AUID which the user has at the authentication center, authentication center sends the request for the confirmation to the user, and the terminal is capable of logging in the APID of the user only after the user send the confirmation to the authentication center.

The login status or the session status sent by a service party to the authentication center includes the "terminal identification information" corresponding to a terminal. And "corresponding to a terminal" refers to corresponding to one of different terminals used by the user separately.

The login status or the session status sent by a service party to the authentication center includes the "program identification information" corresponding to a specific program on a terminal. And "corresponding to a specific program on a terminal" refers to corresponding to one of different programs on one of different terminals used by the user.

The authentication center stores the "terminal identification information" or/and the "terminal authentication center identification information". And the authentication center is capable of getting the "terminal identification information" of a terminal from the "terminal authentication center identification information" of the terminal. And the authentication center is capable of getting the "terminal authentication center identification information" of a terminal from the "terminal identification information" of the terminal. And a terminal is registered on the authentication center if the authentication center stores the "terminal identification information" or the "terminal authentication center identification information" of the terminal. And a terminal is associated with the AUID which a user has at the authentication center if the terminal's "terminal identification information" or "terminal authentication center identification information" stored by the authentication center is associated with the user's AUID.

The "terminal identification information" or the "terminal authentication center identification information" includes or is accompanied with the "program identification information" by which to distinguish different programs on a terminal. And a user (directly or by using the authentication center) or the authentication center is capable of identifying a specific program which the user uses on a terminal to log in the APID which the user has at a service party.

A specific program which a user uses on a terminal to log in the APID which the user has at a service party stores the "program identification information" of the specific program. When a user is using a program of a terminal to log in the APID which the user has at a service party, the program is capable of sending the "program identification information" of the program to the service party.

An authentication program which a user uses on a terminal to log in the AUID which the user has at the authentication center stores the "program identification information". When a user is using the authentication program on a terminal to use a specific program to log in the APID which the user has at a service party, the authentication program is capable of sending the "program identification information" of the specific program to the authentication center through the specific program and the service party.

A user uses an authentication program to log in the AUID which the user has at the authentication center. And the authentication program on a terminal stores the "terminal identification information" of the terminal.

A user uses an authentication program to log in the AUID which the user has at the authentication center. And the authentication program on a terminal stores the "program identification information" of a specific program which the user uses to log in the APID which the user has at a service party.

A specific program which a user uses on a terminal to log in the APID at a service party stores the "program identification information" of the specific program of the terminal. And when the user uses the specific program of the terminal to log in a service party, the specific program sends the "program identification information" to the service party.

The login status or the session status which the authentication center sends to a current terminal which the user is using include the "terminal identification information" corresponding to one of different terminals used by the user and/or include the "terminal authentication center identification information" corresponding to one of different terminals used by the user.

A terminal used by a user stores at least one of the "terminal identification information" and the "terminal authentication center identification information". And the authentication center is capable of getting the "terminal identification information" of a terminal from the "terminal authentication center identification information" of the terminal. And the authentication center is capable of getting the "terminal authentication center identification information" of a terminal from the "terminal identification information" of the terminal.

A terminal used by a user stores at least one of the "terminal identification information" and the "terminal service party identification information". And a service party is capable of getting the "terminal identification information" of a terminal from the "terminal service party identification information" of the terminal. And a service party is capable of getting the "terminal service party identification information" of a terminal from the "terminal identification information" of the terminal.

Different terminals used by a user have different "terminal identification information" or different "terminal authentication center identification information" or different "terminal service party identification information". And different terminals used by a user have different "terminal identification information". And different terminals used by a user have different "terminal authentication center identification information". And different terminals used by a user have different "terminal service party identification information". And the "different" refers to different from each other or refers to not the same one.

A service party is capable of distinguishing different terminals used by a user according to the "terminal identification information" or the "terminal service party identification information".

The authentication center is capable of distinguishing different terminals used by a user according to the "terminal identification information" or the "terminal authentication center identification information".

A user is capable of distinguishing different terminals used by the user according to the "terminal identification information" or the "terminal authentication center identification information" or the "terminal service party identification information".

A same terminal used by a same user has a same "terminal identification information" or a same "terminal authentication center identification information" or a same "terminal service party identification information".

There is a corresponding agreed algorithm or the secret key pair between a service party and the authentication center or between the authentication center and a terminal used by a user or between a service party and a terminal used by a user. And the "terminal identification information" or the "terminal authentication center identification information" or the "terminal service party identification information" is transferred by the agreed algorithm or the secret key pair. And the secret key pair is symmetric encryption or asymmetric encryption. A service party and the authentication center, or the authentication center and a terminal used by the user, or a service party and a terminal used by a user respectively have the agreed algorithm or a part of the agreed algorithm or the symmetric encryption key or one of the asymmetric encryption key pair, and both are capable of calculating separately based on the agreed algorithm or the secret key pair while transferring the "terminal identification information" or the "terminal authentication center identification information" or the "terminal service party identification information". For example: a user's terminal has a private key, and a service party has the public key corresponding to the private key, and the user's terminal encrypts the "terminal identification information" or the "terminal service party identification information" by the private key and sends the encryption information to the service party, and the service party decrypts the encryption information by the public key to get the "terminal identification information" or the "terminal service party identification information". For another example: a user's terminal has a private key, and the authentication center has the public key corresponding to the private key, and the user's terminal encrypts the "terminal identification information" by the private key and sends the encryption information to the service party, and the service party puts the encryption information into the login status to send together to the authentication center, and the authentication center decrypts it by the public key to get the "terminal identification information".

Each time a user uses a terminal to reconnect and log in a service party, the terminal sends the "terminal identification information" of the terminal or the "terminal service party identification information" of the terminal to the service party. And the service party is capable of getting the "terminal identification information" of the terminal according to the "terminal service party identification information" of the terminal. And the connection refers to generalized connection, which includes the connection based on the identification information and the connection based on the network addresses, for example: the session connection based on the identification information and the TCP connection based on the network addresses. Or the connection may refer to the connection based on the network addresses mapping, for example: the connection based on TCP or IP addresses. And the service party stores the "terminal service party identification information" of the terminal. And the "terminal identification information" may be stored on the terminal, or be transferred from the authentication center to the terminal and then be transferred from the terminal to the service party, or be input into the terminal by the user. And the "terminal identification information" or the "terminal service party identification information" may be set by the user or be generated by the authentication center or be a feature information of the terminal itself.

The "terminal identification information" or the "terminal service party identification information" sent from a user's terminal to a service party may be stored at the terminal of the user or be sent to the terminal of the user by the authentication center. For example: the user's terminal and the authentication center both are capable of storing only the "terminal authentication center identification information" (which is generated by the authentication center and sent to the user's terminal when the user logs in the authentication center), and after the user logs in the authentication center by using the terminal, the authentication center gets the "terminal authentication center identification information" of the terminal of the user, and when the user logs in the service party by using the terminal, the service party informs the authentication center, and the authentication center generates a "terminal identification information" for the terminal and sends it to the terminal, and the terminal of the user sends the "terminal identification information" and the login request together to the service party, and the service party sends the "terminal identification information" together to the authentication center while sending the login status or the session status to the authentication center, and the authentication center is capable of distinguishing the terminal by the "terminal identification information". For another example: the user's terminal and the service party both have the "terminal service party identification information" (Supposing that it's generated and distributed by the user's terminal), and the user's terminal, the service party and the authentication center all have the "terminal identification information" (Supposing it's generated and distributed by the authentication center), and the user sends the "terminal service party identification information" to the service party when the user logs in the service party, and the service party gets the corresponding "terminal identification information" according to the "terminal service party identification information", and the service party sends the "terminal identification information" to the authentication center.

After a user logs in the APID which the user has at a service party by using a terminal, the service party stores correspondingly the login status or the session status of the terminal logging in the APID which the user has and the "terminal identification information" or the "terminal service party identification information" of the terminal. And the service party is capable of getting the "terminal identification information" or the "terminal service party identification information" of the terminal according to the login status or the session status of the terminal. For example: the service party stores the login status of the terminal by means of the session secret key, and the service party stores the "terminal identification information" of the terminal and the session secret key of the terminal correspondingly.

Each time a user uses a terminal to reconnect and log in the authentication center, the terminal sends the "terminal identification information" of the terminal or the "terminal authentication center identification information" of the terminal to the authentication center. And the authentication center is capable of getting the "terminal identification information" of the terminal from the "terminal authentication center identification information" of the terminal. And the connection refers to generalized connection, which including the connection based on the identification information and the connection based on the network address, for example: the session connection based on the identification information and the TCP connection based on the network addresses. And the connection may refer to the connection based on network addresses mapping, for example: the connection based on the TCP or IP addresses.

The "terminal identification information" or the "terminal authentication center identification information" of a terminal includes the "terminal user identification information" set by a user for the terminal, or there is the "terminal user identification information" set by a user for a terminal corresponding to the "terminal identification information" or the "terminal authentication center identification information" of the terminal. For example: on an interface which has logged in the authentication center, the user is capable of setting the "terminal user identification information" for one of different terminals, such as "my mobile phone", "my office computer", "my home computer". And the "terminal user identification information" may be the "terminal identification information" or a part of the "terminal identification information", also may be the information stored at the authentication center and corresponding to the "terminal identification information" or corresponding to the "terminal authentication center identification information"

When the login status or the session status of a terminal logging in the APID which a user has at a service party is invalid, only after the user inputs a user verification information into the terminal, or after the user passes the identity authentication by using a verification device, or after the user passes the indirect authentication of a third party on the terminal, the terminal is capable of logging in the APID which the user has at the service party, and then the login status or the session status of the terminal logging in the APID which the user has at the service party is capable of changing to be valid.

When the login status or the session status of a terminal logging in the AUID which a user has at the authentication center is invalid, only after the user inputs a user verification information into the terminal, or after the user passes the identity authentication by using a verification device, or after the user passes the indirect authentication of a third party on the terminal, the terminal is capable of logging in the AUID which the user has at the authentication center, and then the login status or the session status of the terminal logging in the AUID which the user has at the authentication center is capable of changing to be valid.

When the login status or the session status of a terminal logging in the APID which a user has at a service party is invalid and the login status or the session status of the terminal logging in a third party is invalid too, only after the user inputs a user verification information into the terminal, or after the user passes the identity authentication by using a verification device, the login status or the session status of the terminal logging in the APID which the user has at the service party is capable of changing to be valid, in which the "pass the identity authentication" refers to that the user passes the identity authentication of the service party or the third party by using the terminal.

When the login status or the session status of a terminal logging in the AUID which a user has at the authentication center is invalid and the login status or the session status of the terminal a logging in a third party is invalid too, only after the user inputs a user verification information into the terminal, or after the user passes the identity authentication by using a verification device, the login status or the session status of the terminal logging in the AUID which the user has at the authentication center is capable of changing to be valid, in which the "pass the identity authentication" refers to that the user passes the identity authentication of the authentication or the third party by using the terminal.

A user verification information or a user verification device is the information or the device uniquely owned by the user and by which the user is capable of passing the identity authentication on different terminals. The "inputting a user verification information into the terminal" refers to inputting into the terminal by the input device of the terminal or by other device.

A user verification device is a portable external device.

That a user inputs a user verification information into a terminal or that a user uses a user verification device refers to that the user inputs a user verification information manually or that the user uses a user verification device manually.

The means of inputting a user verification information and the means of using a user verification device include username/password, returning code or agreed code, user biological characteristics, portable external IC card, and scanning two-dimensional code by mobile phone. And username/password, returning code, agreed code, or user biological characteristics is a user verification information. And mobile phone or portable external IC card is a user verification device. And the returning code is the means that the authentication center or the service party returns a confirmation code to a specific terminal of a user and the user inputs it into the current terminal to pass the identity authentication of the authentication center or the service party. And the agreed code may be paper-based or electronic dynamic password and a user must input the agreed code of designated sequence number or input the dynamic password displayed currently to pass the authentication. And the user biological characteristics is the means that a user uses his own biological characteristics to pass the identity authentication, for example, the fingerprint of the user. And the portable external IC card is the means of USB key and a user must connect the IC (USB key) to the peripheral interface (USB interface) of the terminal to pass the authentication. And the scanning two-dimensional code by mobile phone refers to the means that a user uses the camera of the mobile phone to scan the two-dimensional code for login displayed by a terminal displayer and then the mobile phone sends the information of the two-dimensional code to the party which is logged in or to a third party assisting the login, where the party which is logged in permits the terminal of the user to log in the corresponding user account of the party if the party which is logged in or the third party confirms that the information of the two-dimensional code is correct, where the third party will notify the party which is logged in after the third party confirms that the information of the two-dimensional code is correct.

If the login status or the session status of a terminal logging in the APID which a user has at a service party is valid, the terminal is capable of logging in the APID which the user has at the service party with no need for that the user inputs a user verification information into the terminal and with no need for that the user uses user verification device to pass identity authentication and with no need for that user passes the indirect authentication on the terminal.

If the login status or the session status of a terminal logging in the AUID which a user has at the authentication center is valid, the terminal is capable of logging in the AUID which the user has at the authentication center with no need for that the user inputs a user verification information into the terminal and with no need for that the user uses a user verification device to pass identity authentication and with no need for that user passes the indirect authentication on the terminal.

If the login status or the session status of a terminal logging in the APID which a user has at a service party or logging in the AUID which a user has at the authentication center is invalid, the terminal is capable of logging in the APID which the user has at the service party or the AUID which the user has at the authentication center only after that the user passes identity authentication on the terminal by inputting a user verification information or using a user verification device or passes the indirect authentication on the terminal.

When a user uses a terminal to log in a service party, a third party refers to another party different from the terminal and the service party on network. When a terminal logs in a service party through the indirect authentication of a third party, the authentication center may be the third party which provides the indirect authentication of the third party.

When a user logs in the authentication center by using a terminal, a third party refers to another party different from the terminal and the authentication center on network.

Before a user passes the indirect authentication of a third party to log in a service party or the authentication center, the user has passed the identity authentication of the third party on the terminal by inputting a user verification information or using a user verification device. And in the procedure that the terminal logs in the service party or the authentication center through the indirect authentication of the third party, the user doesn't need to perform the authentication of the third party on the terminal again by inputting a user verification information or using a user verification device. And the third party is the third party or intermediary party which provides the indirect authentication of third party on internet.

After a user logs in the AUID which the user has at the authentication center by using a terminal and makes the login status or the session status of the terminal logging in the AUID from invalid to valid, a service party is capable of sending the login status or the session status to the authentication center. When a user logs in the AUID which the user has at the authentication center by using a terminal, the authentication center is capable of sending the requests for refreshing the status to the service parties which the user's AUID's corresponding APIDs are at, and then each of the service parties which receive the request for refreshing the status sends the login status or the session status of different terminals used by the user logging in the APID which the user has at the service party to the authentication center. And the service parties which the user's AUID's corresponding APIDs are at may be the service parties which the user's AUID's all corresponding APIDs are at, or may be the service parties of the specific APIDs specified by the user.

When a user requests for refreshing the information of the status on a terminal's interface which has logged in the authentication center used by the user, the service parties are capable of sending the login status or the session status to the authentication center. When a user logs in the AUID which the user has at the authentication center by using a terminal and chooses to request for refreshing the information of the status, the authentication center sends the request for refreshing the status to the service parties which the user's AUID's corresponding APIDs are at, and then each of the service parties which receive the request for refreshing the status sends the login status or the session status of different terminals used by the user logging in the APID which the user has at the service party to the authentication center. And the service parties which the AUID's corresponding APIDs are at may be the service parties which the AUID's all corresponding APIDs are at, or may be the service parties of the specific APIDs specified by the user.

When the login status or the session status of a terminal used by a user logging in the APID which the user has at a service party changes, the service party sends the refreshed login status or the session status to the authentication center. When the login status or the session status changes, the service party sends the refreshed login status or the session status to the authentication center only when the login status or the session status of the user logging in the authentication center is valid.

The login status or the session status may be one of at least two status which include valid status and invalid status. And the valid status may include active status and dormant status. For example: if the session secret key of a user's terminal is valid in the valid login status or the session status, the login status or the session status may be regarded as dormant status when the terminal doesn't maintain valid TCP connection with the service party or with the authentication center or when the terminal doesn't communicate with the service party or the authentication center in a specific duration, and on the contrary, the login status or the session status may be regarded as active status when the terminal maintains valid TCP connection with the service party or with the authentication center or when the terminal communicates with the service party or the authentication center in a specific duration.

In the information which a service party sends to the authentication center, there is other information of the APID which a user has besides the login status or the session status of the terminals used by the user logging in the APID which the user has at the service party. And a service party may send other related information of the APID which a user has to the authentication center while sending the login status or the session status to the authentication center. A service party sends other related information of the APID which a user has to the authentication center, when the login status or the session status of logging in a terminal used by the user logging in the APID which the user has at the service party changes from invalid to valid, or when the user requests refreshing other related information on the interface which has logged in the authentication center, or when other related information of the APID which the user has at the service party changes.

A user may pass the login authentication of a service party by using the authentication center after logging in the authentication center by using a terminal, and the user may log in the service party by using the terminal after passing the login authentication of the service party. And if the authentication status of the user's terminal at the authentication center is valid, the user may log in one of different service parties by one click on the terminal. And that a user logs in a service party by passing the indirect authentication of the authentication center as a third party includes two steps, and the first step is that the user passes the identity authentication of the authentication center, and the second step is that the user passes the login authentication of the service party by using the authentication center and logs in the service party. And the first step requires that the user uses a user verification information or a user verification device on the terminal, and the second step doesn't need a user verification information or a user verification device.

After a user logs in the authentication center by using a current terminal, the list of the APIDs which the user has at different service parties associated with the authentication center will be displayed on an interface of the current terminal which the user is using when the interface has logged in the authentication center.

A user logs in the authentication center by using an authentication program on a terminal. And the user is capable of setting the login status or the session status on the interface of the authentication program.

A user logs in the APIDs which the user has at different service parties by using the authentication center and the authentication program.

A user may log in one of the APIDs which the user has at different service parties by one click on the interface of the authentication program.

A user is not capable of logging in a service party by using the authentication program when the authentication program stops running, and only when a user logs in the authentication center by using the authentication program, the user is capable of logging in the APID which the user has at a service party through the authentication program.

A user is capable of using other program which is not the authentication program to log in the APID which the user has at the service party by using the authentication program.

If an authentication program on a terminal is running and the login status of the authentication program logging in the AUID which a user has at the authentication center maintains valid, the authentication program will participate in the steps of transferring the "terminal identification information" of the terminal or the "terminal service party identification information" of the terminal to a service party when the user logs in the service party.

If an authentication program on a terminal maintains running and the login status of the terminal logging in the AUID which a user has at the authentication center maintains valid, the authentication program will participate in the procedure that the user logs in the APID which the user has at a service party by using the terminal.

Different service parties are separate from each other and don't share the account security with each other.

Different service parties are separate from each other and don't need to trust each other and have no trust relationship to each other.

Different service parties don's share the account security with each other.

A same user's APIDs at different service parties are separate from each other and don't need to trust each other or to be associate with each other.

There is no mutual membership relation to each other between a service party and the authentication center. And a service party and the authentication center are the entities operating separately.

The terminals, the service parties and the authentication center are connected through internet. And the information transmission between the terminals, the service parties and the authentication center is carried out through internet.

The authentication center or a service party may be a server or a server group. And a service party may be a provider of service on internet which provides the resources and services to users through internet, such as a website. And the authentication center is an operator on internet which is specialized in providing the authentication login service through internet.

A terminal used by a user may be PC, desktop computer, notebook computer, tablet computer or smart mobile phone.

The communication path or route of the separate connection which a user establishes to a service party by using a terminal doesn't include or doesn't pass through the authentication center. The communication path or route of the separate connection which a user establishes to the authentication center by using a terminal doesn't include or doesn't pass through a service party.

The "terminal identification information" or the "terminal authentication center identification information" of a terminal is or includes the feature information of the terminal itself. And the feature information may be generated by the program by which the user logs in the authentication center on the terminal. For example, the feature information may be terminal name, serial number, model name or the like.

Different service parties trust the authentication center, so after a user associates the user's AUID with the user's APID at a service party correspondingly, the service party is capable of sending the login status or the session status of a terminal used by the user logging in the APID which the user has at the service party to the authentication center and is capable of permitting the user to set at the authentication center the login status or the session status of a terminal used by the user logging in the APID which the user has at the service party.

Different terminals used by a user include the terminals which the user used before and the terminals which the user is using currently. And different terminals refers to multiple terminals which are not the same terminal obviously. And the configurations and the operating systems of different terminals may be the same or different. And the types of different terminals may be the same or different, for example: different terminals may all be PC, or include different types of terminals such as PC and mobile phone.

A terminal which a user uses to log in the authentication center may be or may not be the terminal which the user uses to log in a service party, and vice versa, the terminal which a user uses to log in a service party may be or may not be the terminal which the user uses to log in the authentication center. For example: a user is capable of using terminal A and terminal B to log in the service parties, and then the user is capable of using terminal B and terminal C to log in the authentication center.

After a user logs in the APID which the user has at a service party by using a terminal, the terminal is capable of maintaining the valid login status or the session status of the terminal logging in the APID which the user has at the service party. And the valid login status or the session status of the terminal logging in the APID which the user has at the service party may be set invalid by the user on the terminal. And the user may set the login status or the session status of by which the terminal logging in the APID which the user has invalid on the terminal's interface which has logged in the APID which the user has at the service party. For example: the user may choose to quit the login on the interface which has logged in the service party.

After a user logs in the AUID which the user has at the authentication center by using a terminal, the terminal is capable of maintaining the valid login status or the session status of the terminal logging in the AUID which the user has at the authentication center. And the valid login status or the session status of the terminal logging in the AUID which the user has at the authentication center may be set invalid by the user on the terminal. And the user may set the login status or the session status of the terminal logging in the AUID which the user has invalid on the terminal's interface which has logged in the AUID which the user has at the authentication center. For example: the user may choose to quit the login on the interface which has logged in the authentication center.

When a user logs in the APID which the user has at a service party by using different terminals, the login status or the session status of different terminals logging in the APID which the user has at the service party may be valid at the same time.

A user is capable of setting the "terminal identification information" of a terminal or the "terminal authentication center identification information" of the terminal or the "terminal user identification information" of the terminal at the terminal's interface which has logged in the AUID which the user has at the authentication center.

A user uses a program on a terminal to set the "terminal identification information" or the "terminal service party identification information" or the "terminal authentication center identification information" or the "terminal user identification information" of the terminal, and when the user logs in a service party, the program participates in the steps which sends the "terminal identification information" of the terminal or the "terminal service party identification information" of the terminal to the service party.

The authentication center stores the corresponding relationships between the AUID which a user has at the authentication center and the APIDs which the user has at different service parties, and more specifically it may be: the authentication center stores correspondingly the AUID which the user has at the authentication center and the APIDs which the user has at different service parties. The corresponding relationship between the AUID and an APID at a service party is associated by the user at the authentication center or at the service party, and after the user associates at the service party, the service party sends the notification of the association or the confirmation of the association to the authentication center.

A service party stores the corresponding relationship between the AUID which a user has at the authentication center and the APID which the user has at the service party too. After the user associates the AUID and the APID at the authentication center or at the service party, the service party stores the APID and the AUID correspondingly.

On an interface which has logged in the AUID which a user has at the authentication center, the user is capable of setting the "terminal identification information" or the "terminal authentication center identification information" or the "terminal user identification information" of different terminals.

Different terminals of a same user connect to network or internet separately.

Different users may use a same terminal or different terminals. For example: different users may use a same public desktop computer in an internet cafe.

A terminal's interface which has logged in the AUID which a user has at the authentication center is capable of displaying the specific account information of the APIDs which the user has at different service parties, and the user is capable of changing the specific account information of the APIDs which the user has at different service parties on the terminal's interface which has logged in the AUID which the user has at the authentication center.

The specific account information includes a user's contact information, and the user's contact information includes the user's mobile number or/and the user's email address. And the user's contact information may include the user's contact address too.

The specific account information includes a user's head portrait or/and nickname.

The specific account information includes a user's real-name authentication information. The user is capable of operating on a terminal's interface which has logged in the authentication center to transfer and set the user's own real-name authentication information authenticated at the authentication center to a service party when the service party and the authentication center permit, or the user is capable of operating on a terminal's interface which has logged in the authentication center to delete or to invalidate or to delete and invalidate the user's own real-name authentication information at a service party when the service party and the authentication center permit.

After a user passes the real-name authentication of the authentication center, the authentication center maintains the real-name authentication information of the user. And the means that the user passes the real-name authentication of the authentication center may be the online authentication or the offline authentication.

The real-name authentication information includes the national identification number of a user or the passport number of a user.

The specific account information includes the permission to permit the APID which a user has at a service party to pay or/and to receive the payment, or/and includes the permission to permit the APID which the user has at a service party to pay or/and to receive the payment through the user's other fund account which is not at the service party. And the user's other fund account which is not at the service party is the user's account at a bank which is not the service party or at other institution which is not the service party.

A user is capable of operating on a terminal's interface which has logged in the AUID which the user has at the authentication center to associate the APID which the user has at a service party to the user's other fund account which is not at the service party, which authorize the APID which the user has at the service party to pay with the fund of the other fund account or/and to receive the payment for the other fund account.

A user is capable of operating on a terminal's interface which has logged in the AUID which the user has at the authentication center to cancel or invalidate the association or the authorization of the user between the APID which the user has at a service party and the user's other fund account which is not at the service party.

The specific account information includes a user's contact address.

The specific account information may include other information of the APID which a user has at a service party.

On a terminal's interface which has logged in the AUID which the user has at the authentication center, a user is capable of setting to permit or forbid a specific service party to get the specific account information from the authentication center. And the specific service party may be a specific service party or a specific type of service parties or all service parties.

The specific account information set by a user at the authentication center for a service party may be the specific account information specifically set for the service party, or may be the unified specific account information specifically set for a type of service parties, or may be the unified specific account information set for all service parties, or may be the specific account information set for the AUID which the user has at the authentication center.

A service party stores the user's APID's specific account information in the service party locally, or the service party is capable of getting the specific account information which the user set at the authentication center for the APID which the user has at the service party when the service party needs to use the specific account information of the user.

A service party stores a user's APID's specific account information in the service party locally, and when the user logs in the authentication center and sets at the authentication center to change the specific account information of the APID, the authentication center sends the information about the change of the setting to the service party.

When a service party needs to use the specific account information of a user, the service party is capable of getting the specific account information from the authentication center, and the specific account information is set by the user at the authentication center for the APID which the user has at the service party. When a user is logging in the user' APID at a service party or after a user logs in the APID which the user has at a service party, the service party is capable of getting the specific account information from the authentication center, and the specific account information is set by the user at the authentication center for the service party.

That a user sets or operates at the authentication center refers to: after the user logs in the AUID which the user has at the authentication center by using a terminal, the user sets or operates on the terminal's interface which has logged in the AUID which the user has at the authentication center.

That a user sets or operates at the authentication center refers to: after the user logs in the AUID which the user has at the authentication center by using a authentication program running on a terminal, the user sets or operates on the terminal's authentication program's interface which has logged in the AUID which the user has at the authentication center.

A user uses an authentication program on a terminal to log in the authentication center.

A user sets or operates the authentication center on a terminal's authentication program's interface which has logged in the AUID at the authentication center.

A user is capable of operating to choose to log in different service parties on a terminal's authentication program's interface which has logged in the AUID at the authentication center.

The program which a user uses to log in a service party is the authentication program, or the program which a user uses to log in a service party is not the authentication program. For example: when the authentication program is a browser, a user is capable of logging in a service party by a same browser. For example: when the authentication program is a special program issued by the authentication center, the user is capable of logging in a service party by a new browser opened by the authentication program.

A user is capable of logging in a service party by one click on a terminal's authentication program's interface which has logged in the AUID at the authentication center. For example, the user clicks on a link to a service party on the authentication program's interface, and then the terminal of the user logs in the service party directly.

The specific account information of the APID which a user has at a service party is displayed on an authentication program's interface which has logged in the AUID which the user has at the authentication center, and the user sets at the authentication program's interface which has logged in the AUID which the user has at the authentication center to change the user's specific account information at different service parties.

When a user's terminal or the authentication program stops running, the terminal's login or the authentication program's login logging in the AUID which the user has at the authentication center is invalid too.

When the login by which a user's terminal or an authentication program logs in the AUID which the user has at the authentication center is invalid, the user must input again a user verification information into the terminal or use a verification device on the terminal to pass the identity authentication, and then the terminal or the authentication program is capable of logging in the AUID which the user has at the authentication center again. For example: a user's terminal is a mobile phone which opens the operating system's interface by fingerprint identification, and the user must use the fingerprint to reopen the mobile phone's operating system's interface after the mobile phone is shut down, and the mobile phone is capable of logging in the AUID which the user has at the authentication center again only after the interface of the mobile phone is open, and of course, the mobile phone may need pass other authentication or the authentication of the authentication center to log in the AUID which the user has at the authentication center after the user opens the interface of the operating system of the mobile phone.

A login is maintained by a session based on the session information of two parties or maintained by a connection based on the network addresses of two parties. For example, the login by which a user's terminal logs in the AUID at the authentication center or the login by which a user's terminal logs in the APID at a service party may be based on the connectionless session of two parties (such as session secret key or Session ID), and may also be the connection based on the network addresses (TCPIP addresses) mapping of the two parties.

After a user registers the AUID at the authentication center, the user is capable of associating the APIDs which the user has at different service parties with the AUID which the user has at the authentication center, and after the association, the authentication center stores the corresponding relationships between the AUID which the user has and the APIDs which the user has at different service parties.

A user is capable of logging in a service party without using the authentication center, or a user is capable of logging in a service party by using the authentication center and a terminal when the terminal has logged in the authentication center. For example: a user is capable of using a terminal to log in the APID which the user has at a service party directly. For example, a user clicks the link to a service party on a terminal's interface which has logged in the authentication center, and the authentication transfers the verification credential to the service party through the user's terminal, and the credential may be retransmitted to the service party by the authentication program or by other program on the terminal, and at last if the service party confirms that the credential is correct, the terminal logs in the APID which the user has at the service party by the program which retransmits the verification credential.

Each time a user logs in a service party by using the authentication center and a terminal, the authentication center sends the verification credential to the service party directly or through the terminal.

The verification credential is specifically used for a service party by the authentication center, and the verification credential is not capable of being used to log in other service parties.

The verification credential is specifically used for a user or a user's terminal by the authentication center, and other users or other user's terminals are not capable of using the verification credential to log in a service party.

The verification credential has a period of validity and the expired verification credential is invalid.

When a user logs in a service party by using the authentication center, the service party is not capable of pretending to be the user to log in other service parties through the login by which the user logs in the service party. For example, the verification credential is used specifically for a service party by the authentication center, and the service party is not capable of pretending to be a user to log in other service parties by using the verification credential received by the service party.

This invention may form to be a standardized protocol, and the authentication center, the service parties, the users and the terminals may realize this invention based on this protocol. And the authentication center may develop the programs or software modules based on this protocol to provide to the service parties and the users to cooperate to realize this invention.

The invention claimed is:

1. A system for authentication center, comprising an authentication center, service parties, users and terminals; wherein a service party is a provider of service on internet which provides service through internet, and the service parties are different and separate providers of service on internet; wherein the authentication center is a service provider which provides login information service through internet, and the authentication center is not one of the service parties, the service parties trust the authentication center; wherein the terminals are connected with the authentication center and the service parties by a network and are capable of communicating with them; wherein the terminals, the service parties and the authentication center are connected through internet; wherein a user has a user account at the authentication center, and the AUID of a user is a user account which the user has at the authentication center; wherein a user has a user account at one service party or at each of more than one service party separately, and an APID of a user is a user account which the user has at a service party; wherein a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; wherein the authentication center stores the corresponding relationships between the AUID of a user and the APIDs which the user has at different service parties; wherein a service party is capable of sending the login status or the session status of different terminals used by a user logging in the APID which the user has at the service party to the authentication center; wherein after a user logs in the AUID which the user has at the authentication center by using a current terminal, the authentication center is capable of sending the login status or the session status of different terminals used by the user logging in the APIDs which the user has at different service parties to the current terminal used by the user, wherein on the current terminal's interface which has logged in the AUID which the user has at the authentication center, the user is capable of seeing and changing or stopping or disabling the login status or the session status of different terminals used by the user logging in the APIDs which the user has at different service parties; wherein on a current terminal's interface which has logged in the AUID which a user has at the authentication center, the user is capable of changing or stopping or disabling the login status or the session status of a terminal used by the user logging in the APID which the user has at a service party, and the authentication center is capable of sending the user's instruction of changing or stopping or disabling to the service party, and the service party is capable of changing or stopping or disabling the login status or the session status of the terminal used by the user logging in the APID which the user has at the service party according to the user's instruction.

2. The system for authentication center according to claim 1, wherein when a user is logging in the APID which the user has at a service party by using a terminal, the service party sends the "terminal identification information" of the terminal to the authentication center, and then the authentication center returns a confirmation to the service party and the confirmation permits or forbids the login, or when a terminal of a user has logged in the authentication center first and then logs in the APID which the user has at a service party by using the authentication center, the authentication center decides directly if the login is permitted.

3. The system for authentication center according to claim 1, wherein each time a user uses a terminal to reconnect and log in a service party, the terminal sends the "terminal identification information" of the terminal or the "terminal service party identification information" of the terminal to the service party, wherein the login status or the session status sent by a service party to the authentication center includes the "terminal identification information" corresponding to a terminal, wherein the service party is capable of getting the "terminal identification information" of a terminal according to the "terminal service party identification information" of the terminal.

4. The system for authentication center according to claim 1, wherein a user logs in the AUID which the user has at the authentication center by using an authentication program on a terminal, and the user is capable of setting the login status or the session status on the interface of the authentication program which has logged in the AUID which the user has at the authentication center, and the program which the user uses to log in the APID which the user has at a service party is not the authentication program.

5. The system for authentication center according to claim 1, wherein when a user logs in the AUID which the user has at the authentication center by using a terminal, the authentication center is capable of sending the request for refreshing the login status or the session status to the service parties which the corresponding APIDs of the user are at, and then each of the service parties which receive the request for refreshing the login status or the session status sends the login status or the session status of different terminals used by the user logging in the APID which the user has at the service party to the authentication center, or when a user requests for refreshing the information of the login status or the session status on a terminal's interface which has logged in the AUID which the user has at the authentication center, each of the service parties which receive the request is capable of sending the login status or the session status to the authentication center.

6. The system for authentication center according to claim 1, wherein the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party, wherein a user is capable of using different terminals to log in a service party, wherein the APIDs which a user has at different service parties are separate from each other.

7. The system for authentication center according to claim 1, wherein a user has a user account or an APID at each of at least two different service parties separately.

8. The system for authentication center according to claim 1, wherein on a terminal's interface which has logged in the authentication center, the user is capable of seeing the list of the login status or the session status of different terminals which the user used or is using logging in the APIDs which the user has at different service parties.

9. The system for authentication center according to claim 1, wherein on a terminal's interface which has logged in the AUID which a user has at the authentication center, the user is capable of distinguishing different terminals according to the login status or the session status of different terminals used by a user logging in the APIDs which the user has at different service parties.

10. The system for authentication center according to claim 1, wherein on a terminal's interface which has logged in the AUID which a user has at the authentication center, the user is capable of distinguish different terminals according to the login status or the session status of different terminals used by a user logging in the APIDs which the user has at different service parties, and the user is capable of changing or stopping or disabling the login status or the session status of one terminal of different terminals used by the user logging in the APID which the user has at a service party, and the authentication center is capable of sending the user's instruction of changing or stopping or disabling to the service party, and the service party is capable of changing or stopping or disabling only the login status or the session status of the one terminal used by the user logging in the APID which the user has at the service party according to the user's instruction.

11. The system for authentication center according to claim 1, wherein on a current terminal's interface which has logged in the AUID which a user has at the authentication center, the user is capable of changing or stopping or disabling the login status or the session status of a terminal used by the user logging in the APID which the user has at a service party, and the authentication center is capable of sending the user's instruction of changing or stopping or disabling to the service party, and the service party is capable of changing or stopping or disabling the login status or the session status of the terminal used by the user logging in the APID which the user has at the service party according to the user's instruction, wherein the terminal is not the current terminal.

12. The system for authentication center according to claim 1, wherein a user is capable of making one or more types of settings, and the one or more types of settings include: a user is capable of setting at the authentication center to permit or forbid a specific terminal to log in the APID which the user has at a specific service party; a user is capable of setting at the authentication center to permit or forbid a specific terminal to use a specific function of the user account which the user has at a specific service party; a user is capable of setting at the authentication center to forbid the terminal which is not registered on the authentication center or which is not associated with the AUID which the user has at the authentication center to log in the APID which the user has at a specific service party or to log in the APIDs which the user has at all service parties; a user is capable of making a setting at the authentication center or the authentication center is capable of making a setting automatically by default, wherein the setting is that a specific terminal must log in the APID which the user has at a specific service party by using the authentication center or that a specific terminal is capable of logging in the APID which the user has at a specific service party only when the user has logged in the AUID which the user has at the authentication center by the authentication program.

13. The system for authentication center according to claim 1, wherein the service parties trust the authentication center, so after a user associates the user's AUID with the user's APID at a service party correspondingly, the service party is capable of sending the login status or the session status of a terminal used by the user logging in the APID which the user has at the service party to the authentication center and is capable of changing or stopping or disabling the login status or the session status of a terminal used by the user logging in the APID which the user has at the service party according to the user's instruction which is set by the user at a terminal's interface logged in the user's AUID at the authentication and which is sent to the service party by the authentication center.

14. A system for authentication center, comprising an authentication center, service parties, users and terminals; wherein a service party is a provider of service on internet which provides service through internet, and the service parties are different and separate providers of service on internet; wherein the authentication center is a service provider which provides login information service through internet, and the authentication center is not one of the service parties, the service parties trust the authentication center; wherein the terminals are connected with the authentication center and the service parties by a network and are capable of communicating with them; wherein the terminals, the service parties and the authentication center are connected through internet; wherein a user has a user account at the authentication center, and the AUID of a user is a user account which the user has at the authentication center; wherein a user has a user account at one service party or at each of more than one service party separately, and an APID of a user is a user account which the user has at a service party; wherein a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; wherein the authentication center stores the corresponding relationships between the AUID of a user and the APIDs which the user has at different service parties; wherein a service party is capable of sending the login status or the session status of different programs on different terminals used by a user or different programs used by a user logging in the APID which the user has at the service party to the authentication center; wherein after a user logs in the AUID which the user has at the authentication center by using a current terminal, the authentication center is capable of sending the login status or the session status of different programs on different terminals used by the user or different programs used by the user logging in the APIDs which the user has at different service parties to the current terminal used by the user, wherein on the current terminal's interface which has logged in the AUID which the user has at the authentication center, the user is capable of seeing and changing or stopping or disabling the login status or the session status of different programs on different terminals used by the user or different programs used by the user logging in the APIDs which the user has at different service parties; wherein on a current terminal's interface which has logged in the AUID which a user has at the authentication center, the user is capable of changing or stopping or disabling the login status or the session status of a program on a terminal used by the user logging in the APID which the user has at a service party, and the authentication center is capable of sending the user's instruction of changing or stopping or disabling to the service party, and the service party is capable of changing or stopping or disabling the login status or the session status of the program of the terminal used by the user logging in the APID which the user has at the service party according to the user's instruction.

15. The system for authentication center according to claim 14, wherein the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party; wherein a user has a user account or an APID at each of at least two different service parties separately; wherein a user is capable of using different terminals to log in a service party.

16. The system for authentication center according to claim 14, wherein the login status or the session status sent by a service party to the authentication center includes the "program identification information" corresponding to a specific program on a terminal, or the login status or the session status sent by a service party to the authentication center includes the "terminal identification information" corresponding to a terminal and the "terminal identification information" includes or is accompanied with the "program identification information" by which to distinguish different programs on the terminal, wherein a user or the authentication center is capable of identifying a specific program which the user uses on a terminal to log in the APID which the user has at a service party.

17. The system for authentication center according to claim 14, wherein the service parties trust the authentication center, so after a user associates the user's AUID with the user's APID at a service party correspondingly, the service party is capable of sending the login status or the session status of a program of a terminal used by the user logging in the APID which the user has at the service party to the authentication center and is capable of changing or stopping or disabling the login status or the session status of a program of a terminal used by the user logging in the APID which the user has at the service party according to the user's instruction which is set by the user at a terminal's interface logged in the user's AUID at the authentication and which is sent to the service party by the authentication center.

18. A system for authentication center, comprising an authentication center, service parties, users and terminals; wherein a service party is a provider of service on internet which provides service through internet, and the service parties are different and separate providers of service on internet; wherein the authentication center is a service provider which provides login information service through internet, and the authentication center is not one of the service parties, the service parties trust the authentication center; wherein the terminals are connected with the authentication center and the service parties by a network and are capable of communicating with them; wherein the terminals, the service parties and the authentication center are connected through internet; wherein a user has a user account at the authentication center, and the AUID of a user is a user account which the user has at the authentication center; wherein a user has a user account at one service party or at each of more than one service party separately, and an APID of a user is a user account which the user has at a service party; wherein a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; wherein the authentication center stores the corresponding relationships between the AUID of a user and the APIDs which the user has at different service parties; wherein a user is capable of making one or more types of settings, and the one or more types of settings include: a user is capable of setting at the authentication center to permit or forbid a specific terminal to log in the APID which the user has at a specific service party; a user is capable of setting at the authentication center to permit or forbid a specific terminal to use a specific function of the user account which the user has at a specific service party; a user is capable of setting at the authentication center to forbid the terminal which is not registered on the authentication center or which is not associated with the AUID which the user has at the authentication center to log in the APID which the user has at a specific service party or to log in the APIDs which the user has at all service parties; a user is capable of making a setting at the authentication center or the authentication center is capable of making a setting automatically by default, wherein the setting is that a specific terminal must log in the APID which the user has at a specific service party by using the authentication center or that a specific terminal is capable of logging in the APID which the user has at a specific service party only when the user has logged in the AUID which the user has at the authentication center by the authentication program.

19. The system for authentication center according to claim 18, wherein the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party; wherein a user has a user account or an APID at each of at least two different service parties separately; wherein a user is capable of using different terminals to log in a service party.

20. The system for authentication center according to claim 18, wherein a user is capable of making one or more types of further settings, the one or more types of further settings include: a user is capable of setting at the authentication center to permit or forbid a specific program or a specific program on a specific terminal to log in the APID which the user has at a specific service party; a user is capable of setting at the authentication center to forbid a specific program on a specific terminal or a specific program which is not registered on the authentication center or not associated with the AUID which the user has at the authentication center to log in the APID which the user has at a specific service party or to log in the APIDs which the user has at all service parties; a user is capable of making a setting at the authentication center or the authentication center is capable of making a setting automatically by default, wherein the setting is that a specific program on a specific terminal or a specific program must log in the APID which the user has at a specific service party by using the authentication center or that a specific program on a specific terminal or a specific program is capable of logging in the APID which the user has at a specific service party only when the user has logged in the AUID which the user has at the authentication center by using the authentication program; a user is capable of setting at the authentication center to permit or forbid a specific program on a specific terminal or a specific program to use a specific function of a specific service party.

* * * * *